United States Patent [19]
Jimu et al.

[11] Patent Number: 5,912,083
[45] Date of Patent: Jun. 15, 1999

[54] KEYPAD AND PROCESS FOR PRODUCING THE SAME

[75] Inventors: Masami Jimu, Shiga; Keizo Chikatsune, Osaka; Minoru Fukuzawa, Shiga, all of Japan

[73] Assignee: Kabushiki Kaisha Alpha Giken, Osaka, Japan

[21] Appl. No.: 08/927,211

[22] Filed: Sep. 11, 1997

[30] Foreign Application Priority Data

| Sep. 12, 1996 | [JP] | Japan | 8-299906 |
| Apr. 11, 1997 | [JP] | Japan | 9-093888 |
| Jul. 28, 1997 | [JP] | Japan | 9-201419 |

[51] Int. Cl.⁶ .............................. B32B 25/20; B32B 27/30
[52] U.S. Cl. .................. 428/448; 427/393.5; 427/412.1; 428/451
[58] Field of Search .................... 428/451, 448; 427/393.5, 412.1

[56] References Cited

FOREIGN PATENT DOCUMENTS

| 6-5150 | 1/1994 | Japan . |
| 6-57218 | 3/1994 | Japan . |

*Primary Examiner*—D. S. Nakarani
*Attorney, Agent, or Firm*—Armstrong, Westerman, Hattori, McLeland & Naughton

[57] ABSTRACT

A keypad is disclosed, comprising a structure in which a protective layer made of a 2-cyanoacrylate cured product is provided in a protuberant state on a display pattern formed on a touch base of a silicone rubber-made keypad preferably via a primer coated layer. A process for producing the keypad being also disclosed wherein the protective layer having a high adhesion, hardly generating cracks even by keying operations in a number of times and hardly causing yellowing with a lapse of time can be provided in the display pattern of the keypad made of silicon rubber.

14 Claims, 2 Drawing Sheets

KEYPAD AND PROCESS FOR PRODUCING THE SAME

FIELD OF THE INVENTION

The present invention relates to a keypad having a construction in which a protective layer is provided on a display pattern formed on a touch base of a silicone rubber-made keypad and to a process for producing the same.

BACKGROUND OF THE INVENTION

Operation panels and key-related parts of portable telephones, electrical, electronic or acoustic equipments, and the like are made by a keypad (sometimes called as "touch panel" or "rubber switch") made of an elastic silicone rubber.

In this case, when display patterns such as letters or designs are merely formed on a touch base of the keypad, if the keypad is repeatedly touched, the display pattern wears, whereby it is likely for the display pattern to become unclear or disappear. Further, when the display pattern is merely formed on the touch base, not only a high-grade feeling is not given, but also the display pattern is hardly read from the oblique direction.

In order to cope with this problem, a primer is first applied on the display pattern of the silicone rubber-made keypad, and an epoxy resin is then applied thereon and cured, thereby forming a protuberant cured coated film.

However, since the silicone rubber readily causes deformation or elongation and is non-polar, even when the epoxy resin cured coated film is provided via the primer layer, only a few of primers are effective for increasing the adhesion of the epoxy resin to the silicone rubber, so that the touch is repeated in a number of times, the epoxy resin cured coated film is likely to peel apart. Although the improvement in primers is investigated, the present state is that a primer has selectivity such that while it is effective to certain kinds of silicone rubbers, it does not exhibit a satisfactory primer effect against many other kinds of silicone rubbers, i.e., primers which are effective in a wide range of silicone rubbers are not found.

In addition, even when the issue about adhesive properties can be overcome, there are still disadvantages that it is necessary to mix a main agent with a curing agent; it takes a long period of time for the curing; and that since an air is included in at the time of coating, it is necessary to carry out defoaming under reduced pressure. Also, since the epoxy resin cured coated film is hard, if the number of keying increases, it is likely to cause cracks when hit by nails. Further, there is involved a problem that since the epoxy resin cured coated film is not sufficient in weather resistance, it is likely to cause yellowing with a lapse of time (even in case where an ultraviolet light absorber is added, there is still a limit in improvements in the weather resistance).

SUMMARY OF THE INVENTION

Under these circumstances, the present invention is aimed to provide a keypad comprising a display pattern of a silicone rubber-made keypad having formed thereon a protective layer which has a high adhesion, hardly generates cracks even by keying operations in a number of times and hardly causes yellowing with a lapse of time and to provide a process for producing the same.

DETAILED DESCRIPTION OF THE INVENTION

Figure 1A:
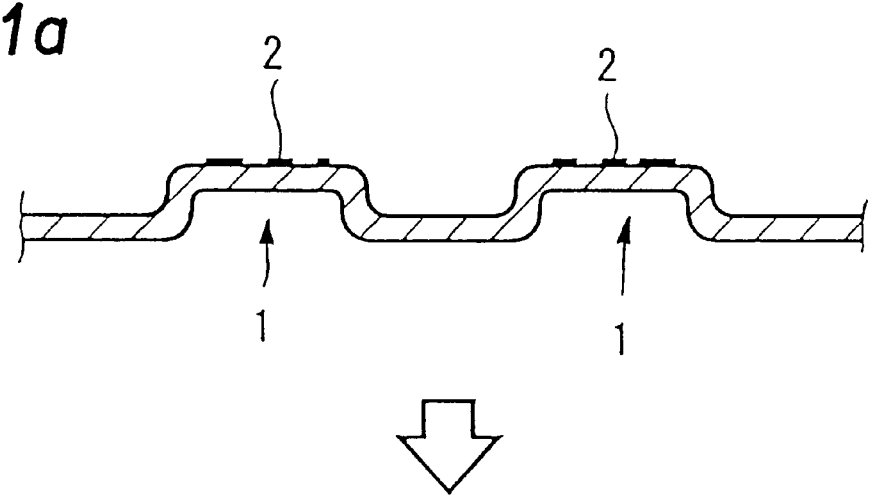
FIGS. 1(a)–(c) are explanatory views to schematically show one embodiment of the production process of a keypad according to the present invention.

The present invention is explained in detail with reference to the accompanying drawings.

The keypad according to the present invention has a structure in which a protective layer 4 made of a 2-cyanoacrylate cured product is provided in a protuberant state on a display pattern 2 formed on a touch base 1 of a silicone rubber-made keypad. In this case, it is particularly preferable to provide the protective layer 4 made of a 2-cyanoacrylate cured product via a primer coated layer 3 on the display pattern 2.

The process for producing the keypad according to the present invention comprises applying a 2-cyanoacrylate on the display pattern 2 formed on the touch base 1 of the silicon rubber-made keypad and curing the 2-cyanoacrylate to form the protective layer 4 made of a 2-cyanoacrylate cured product in a protuberant state. In this case, it is particularly preferable to apply a primer on the display pattern 2, dry the primer to form the primer coated layer 3, further apply a 2-cyanoacrylate thereon, and cure the 2-cyanoacrylate to form the protective layer 4 made of a 2-cyanoacrylate cured product.

The present invention is explained below in more detail.

[Silicone Rubber and Touch Base 1]

The keypad according to the present invention is made of a silicone rubber. The term "silicone rubber" as referred to herein is used in terms of wide meanings and means molded or layered ones made of an unmodified or modified high-molecular weight material having a polyorganosiloxane structure. The touch base 1 as referred to herein means a touch operation part of the silicon rubber-made keypad.

[Display Pattern 2]

On this touch base 1 of the silicon rubber-made keypad is formed the display pattern 2 such as numerals, letters, symbols, or designs. The formation of the display pattern 2 is carried out in an arbitrary manner such as a printing process or an etching process.

[Primer and Primer Coated Layer]

In order to improve the adhesive properties of the protective layer 4 as described below, it is preferable that the primer is applied on the display pattern 2 and dried to form the primer coated layer 3.

As the primer which can be used, any primers (including surfactants) can be arbitrarily used so far as they exhibit a primer effect (an effect for improving the adhesive properties). However, those having a composition comprising a silicone-based oil, a trialkylamine, and a solvent are particularly preferable.

As the silicone-based oil which can be used, any of dimethyl silicone oils, non-dimethyl silicone oils, and modified silicone oils are useful. Of these, examples of modified silicone oils include amino-modified silicones, alkyl-modified silicones, aminoalkyl-modified silicones, fatty acid-modified silicones, epoxy-modified silicones, carboxy-modified silicones, polyether-modified silicones, hydroxy-modified silicones, phenyl-modified silicones, and hydrogen-modified silicones.

As the trialkylamine which can be used, those in which the three alkyl groups are a methyl group, an ethyl group, a propyl group, a butyl group, a pentyl group, a hexyl group, an octyl group, a nonyl group, a decyl group, an undecyl group, a dodecyl group, a tetradecyl group, a hexadecyl group, an octadecyl group, an eicosyl group, or a tetracosyl group, or a combination thereof can be used. Examples thereof include triethylamine, tripropylamine, tributylamine, trilaurylamine, tritetradecylamine, N,N-dimethyloctylamine, N,N-dimethyldodecylamine, N,N-dimethylhexadecylamine, methylethyldodecylamine, and diethyloctylamine. Of these particularly important are N,N-dimethylalkylamines having two methyl groups and one alkyl group having 8 or more carbon atoms.

Examples of solvents which can be used include alcohols (e.g., methanol, ethanol, isopropanol, n-propanol, various butanols, cyclohexanol); ketones (e.g., acetone, methyl ethyl ketone, methyl isobutyl ketone, cyclohexanone); aliphatic, alicyclic or aromatic hydrocarbons (e.g., n-hexane, n-heptane, isoheptane, cyclohexane, methylcyclohexane, benzene, toluene, xylene); esters (methyl acetate, ethyl acetate, n-butyl acetate, isobutyl acetate, isoamyl acetate); ethers (e.g., dioxane, diethyl ether, diisopropyl ether, di-n-propyl ether); halogen-containing solvents (e.g., methylene chloride, perchloroethylene, 1,1,1-trichloroethane, trichloroethylene, chloroform, methylchloroform, carbon tetrachloride); cellosolves (e.g., methyl cellosolve, cellosolve acetate); nitrogen-containing solvents (e.g., nitromethane, nitroethane); and water. Mixtures of these solvents can also be used.

It is preferable that the above-described composition comprises from 0.01 to 5% by weight of the silicone-based oil and from 0.005 to 3% by weight of the trialkylamine, with the remainder being the solvent. In this range, the best desired primer effect can be obtained.

The application of the primer can be carried out by means of, for example, a coating process, a potting process, a printing process, a spray process, a dipping process, or a brushing process.

[2-Cyanoacrylate and Protective Layer 4]

In the present invention, it is preferable that after forming the primer coated layer 3, the 2-cyanoacrylate is applied and cured to form the protective layer 4 made of a 2-cyanoacrylate cured product in a protuberant state.

As the 2-cyanoacrylate which can be used, alkyl 2-cyanoacrylates, cycloalkyl 2-cyanoacrylates, alkoxyalkyl 2-cyanoacrylates, alkenyl 2-cyanoacrylates, or alkynyl 2-cyanoacrylates can be used. Of these, examples of alkyl 2-cyanoacrylates include methyl 2-cyanoacrylate, ethyl 2-cyanoacrylates, various propyl 2-cyanoacrylates, various butyl 2-cyanoacrylates, various pentyl 2-cyanoacrylates, various hexyl 2-cyanoacrylates, and various octyl 2-cyanoacrylates; and examples of alkoxyalkyl 2-cyanoacrylates include ethoxyethyl 2-cyanoacrylate, methoxyethyl 2-cyanoacrylate, and methoxyisopropyl 2-cyanoacrylate.

At this time, it is preferable that the 2-cyanocrylate is a 2-cyanoacrylate having internally added thereto an anionic polymerization promotor in a state dissolved in a plasticizer or solvent (in particular, a plasticizer alone or a mixture of a plasticizer and a solvent). This is because since the anionic polymerization promotor is mixed in a state protected by the plasticizer or its mixture with the solvent with the 2-cyanoacrylate, the pot life after mixing can be ensured. A suitable amount of the anionic polymerization promotor added is from 0.0001 to 3 parts by weight, and particularly from 0.001 to 1 part by weight based on 100 parts by weight of the 2-cyanoacrylate. If the amount of the anionic polymerization promotor added is too small, when the thickness of the protective layer 4 is too thick, the curing promotion is slow, while if it is too big, the pot life is extremely short, whereby the product is no longer practically applicable.

Examples of the above-described anionic polymerization promotor which can be used include inorganic basic substances such as sodium hydroxide and potassium hydroxide; organic basic substances such as N,N-dimethylaniline, N,N-dimethyl-p-toluidine, N,N-dimethyl-m-toluidine, N,N-dimethyl-o-toluidine, N,N-diethyl-m-toluidine, N,N-diethyl-p-toluidine, N,N,N',N'-tetraethylethylenediamine, o-phenylenediamine, trichloroacetamide, succinimide, formamide, N,N-dimethylformamide, N,N-dimethylacetamide, ethylamine, diethylamine, triethylamine, trilaurylamine, isopropylamine, butylamine, tributylamine, monoethanolamine, diethanolamine, triethanolamine, pyrroline, dimethylbenzylamine, ethylenediamine, hexamethylenediamine, lutidine, picoline, 6-amino-2-picoline, pyridine, 2-vinylpyridine, 2,6-dichloropyridine, 4-dimethylaminopyridine, 2-aminopyridine, 3-aminopyridine, 1-vinylimidazole, N-methyl-2-pyrrolidone, N-vinyl-2-pyrrolidone, and diaminophenylmethane; organometallic compounds such as aluminum sec-butoxydiisopropionate; phosphite compounds such as bis(2,4-di-t-butylphenyl)pentaerythritol diphosphite; ester phosphite; organic phosphine compounds; diazabicyclo compounds; aldehyde aniline compounds; and phosphate- or phosphite-containing organotitanium compounds. Of these, organic basic substances, particularly tertiary amines, and more particularly toluidines are important.

As the above-described plasticizer which can be used, various plasticizers which are compatible with the 2-cyanoacrylate, such as phthalic esters, e.g., dibutyl phthalate, dioctyl phthalate, diallyl phthalate, butylbenzoyl phthalate; phosphoric esters, e.g., butylbenzyl phosphate, dibutyl phosphate, tricresyl phosphate, trixylenyl phosphate, cresyldiphenyl phosphate, xylenyldiphenyl phosphate; halogen-containing phosphoric esters, e.g., tris(chloroethyl) phosphate, tris(dichloropropyl) phosphate, tris($\beta$-chloropropyl) phosphate; adipic esters, e.g., dibutyl adipate, dioctyl adipate; sebacic esters, e.g., dimethyl sebacate, dibutyl sebacate, dioctyl sebacate; and benzoic esters, e.g., dipropylene glycol dibenzoate, neopentyl glycol dibenzoate, glycerin tribenzoate, pentaerythritol tetrabenzoate. Besides, carbonate compounds such as ethylene carbonate and propylene carbonate can also be suitably used as the plasticizer. On the other hand, as the solvent, those as described above for the primer can be used.

Also, the 2-cyanoacrylate for forming the protective layer 4 is preferably a 2-cyanoacrylate having internally added thereto an ultraviolet light absorber such as benzophenone- or cyano-based ultraviolet light absorbers. An amount of the ultraviolet light absorber added is usually from 0.01 to 3 parts by weight based on 100 parts by weight of the 2-cyanoacrylate.

In addition, the 2-cyanoacrylate can contain radical polymerization inhibitors (e.g., hydroquinone, hydroquinone monoether, catechol, pyrologallol), anionic polymerization inhibitors (e.g., $BF_3$ complexes, sulfur dioxide, sulfonic acid, other organic or inorganic acids), thickening agents, heat resistance-imparting agents, colorants, thixotropy-improving agents, pH regulators, $H^+$ ion-sealing agents, cross-linking agents, fillers, polymers, and so on. Moreover, the 2-cyanoacrylate can contain the foregoing plasticizers or solvents.

The 2-cyanoacrylate (in case where an anionic polymerization promotor is added thereto and mixed therewith, the working life is from several tens seconds to about 2 hours, and hence, it is used within the working life) is applied on the display pattern 2 (particularly, via the primer coated layer 3. Examples of the application process which can be employed include a potting process, a coating process, and a printing process. As a peculiar process thereof, there can be employed a process in which a mold with a concave portion is molded, a suitable amount of the 2-cyanoacrylate composition is charged in the concave portion, and the display pattern 2 of the silicone rubbermade touch base 1 on which is preferably formed in advance the primer coated layer 3 is then placed thereon in a state that the back side of the display pattern 2 is faced, whereby the protective layer 4 can be provided.

The protective layer 4 is formed in a protuberant state such as a trapezoid state or a lens like state as if a hemisphere being turned down. A maximum thickness of the protective layer 4 is possibly several millimeters but is usually from about 0.5 to 1.5 mm.

[Keypad]

According to the foregoing operation, the keypad having a structure of touch base 1/display pattern 2/protective layer 4 is obtained. In this case, as described previously, it is preferable that the primer coated layer 3 is made present between the pattern 2 and the protective layer 4 to take a 1/2/3/4 structure.

[Utility]

The aforesaid silicone rubber-made keypad can be applied to various utilities such as operation panels, switches, or key-related parts of, e.g., portable telephones, electronic calculators, electric appliances, household appliances (such as an electric washer), electronic appliances, acoustic equipments.

[Function]

According to the present invention, the protective layer 4 which has a high adhesion, hardly generates cracks even by keying operations in a number of times and hardly causes yellowing with a lapse of time can be provided on the display pattern 2 of the silicone rubber-made keypad. The thus obtained keypad is extremely preferable from the aesthetic point of view and ease for identifying the pattern and is advantageous from the standpoint of industrial productivity. In the light of the above, the keypad according to the present invention is of high performance and can meet the requirements for a higher degree.

The present invention is described in further detail with reference to the following Examples and a Comparative Example. In these Examples and Comparative Example, all parts and percents are on a weight basis, unless otherwise indicated. Further, these Examples and Comparative Example are described for the illustrative purpose only, and it should not be construed that the present invention is limited thereto.

EXAMPLE 1 AND COMPARATIVE EXAMPLE 1

Figure 1B:
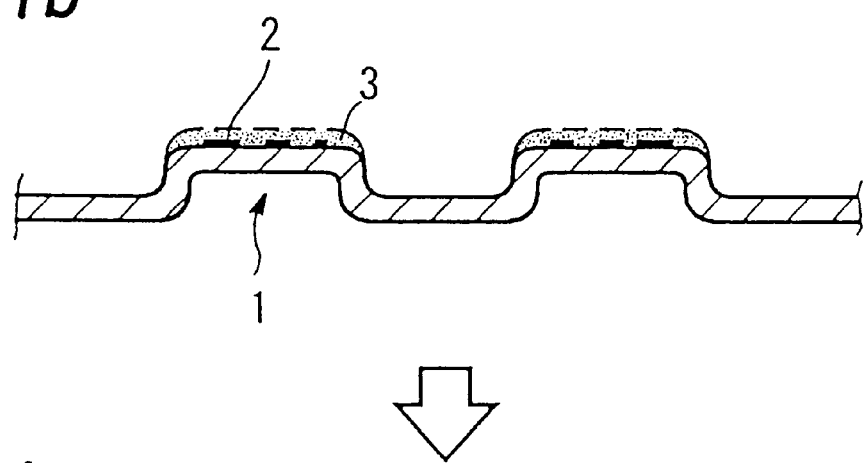
Figure 1C:
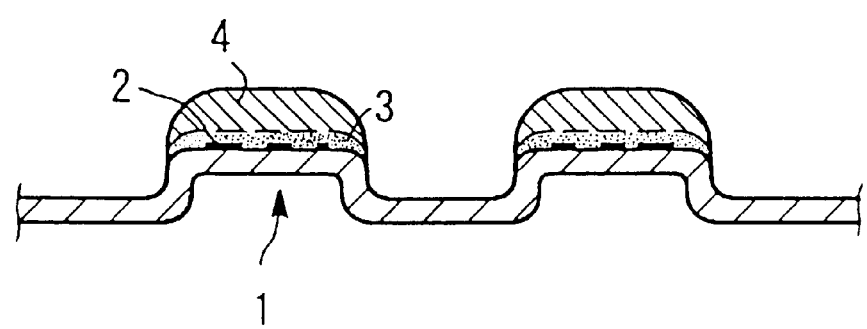
Figure 2:
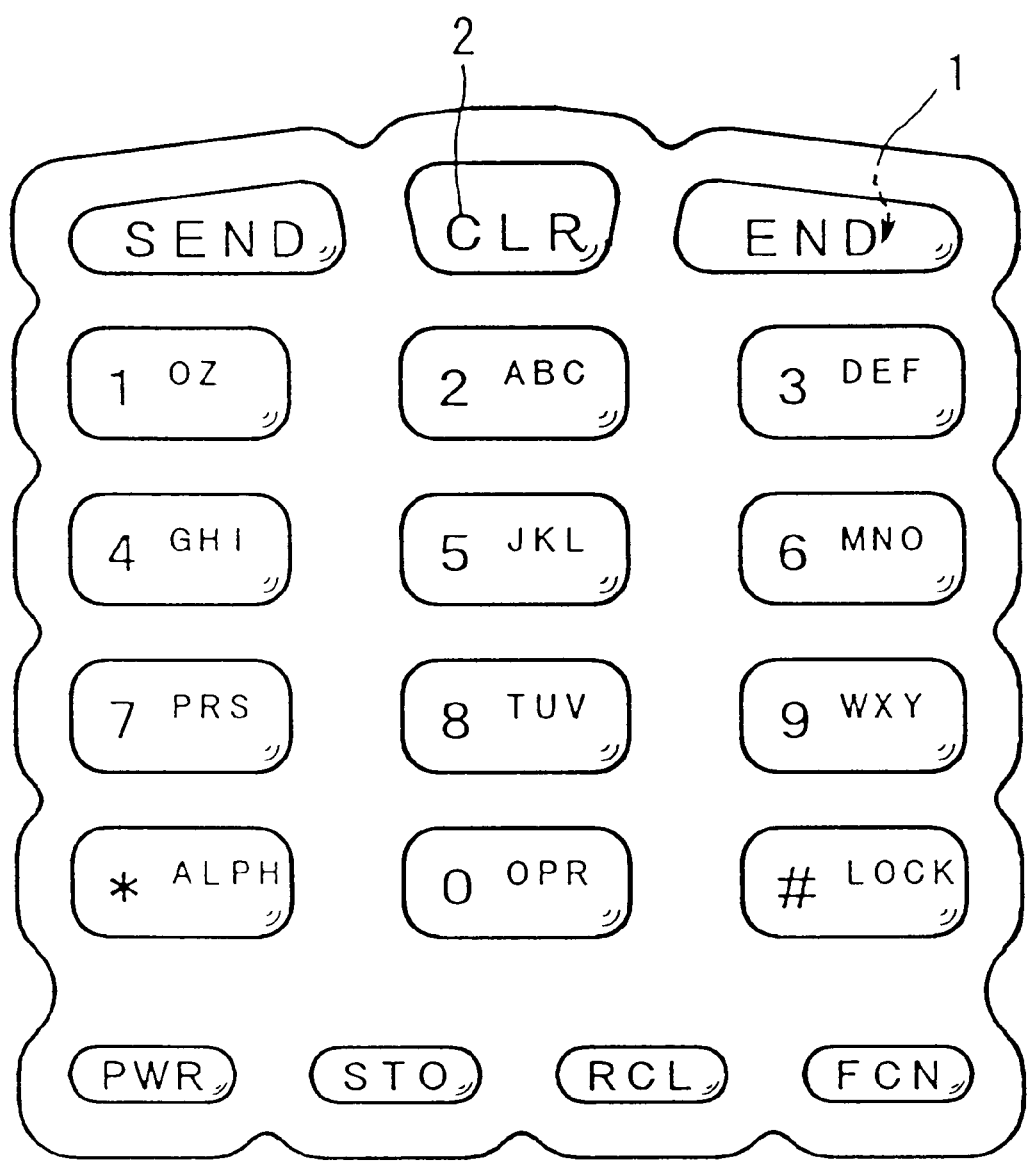
FIG. 2 is a plane view to show one embodiment of a keypad according to the present invention.

FIG. 1 is an explanatory view to schematically show one embodiment of the production process of a keypad according to the present invention; and FIG. 2 is a plane view to show one embodiment of a keypad according to the present invention.

On a unevenly shaped touch base 1 of a raw fabric sheet for a keypad made of a silicone rubber for portable telephones (using each of five kinds of A to E) was prepared a semi-finished product having formed thereon a display pattern 2 comprising key symbols for telephones (such as numerals of from 0 to 9 and symbols, e.g., an asterisk, a CLR, an STO, a PWR) in a printing process or an etching process (see FIG. 1-a).

A primer comprising a composition of a mixture of 10 parts of a 5% concentration solution of a dimethyl silicone oil having a viscosity of 5,000 cps/25° C., "SH200" made by Toshiba Silicone Co., Ltd. dissolved in cyclohexane, 1.5 parts of N,N-dimethyldodecylamine, and 88.5 parts of a mixed solvent of isopropanol and cyclohexane with a weight ratio of 1:1 was prepared. This primer was applied on the display pattern 2 in a roll coating process and spontaneously dried to form a primer coated layer 3 (see FIG. 1-b).

10 g of a product obtained by adding 0.1% of an ultraviolet light absorber ("UVA-635L" made by BASF AG) to ethyl 2-cyanoacrylate containing small amounts of hydroquinone and $SO_2$ as stabilizers was charged in a vessel made of polyethylene, and 0.06 g of a 0.2% concentration composition of N,N-dimethyl-p-toluidine as an anionic polymerization promotor dissolved in tris(chloroethyl)phosphate as a plasticizer was added thereto, followed by well shaking the vessel for mixing the components.

When the thus prepared 2-cyanoacrylate having an anionic polymerization promotor and an ultraviolet light absorber internally added thereto was applied on the above-described primer coated layer 3 in a potting process, the 2-cyanoacrylate was spontaneously cured by the water content in air as well as the curing component internally added, whereby a protective layer 4 in a protuberant state having a maximum thickness of 1 mm such as a lens like state as if a hemisphere being turned down was formed (see FIG. 1-c and FIG. 2).

One day after lapsing, when the protective layer 4 was forcibly peeled off, the silicone rubber itself was destroyed. The protective layer 4 was left transparent and beautiful, and in any of the cases of raw fabric sheets A to E for keypad, problems such as peeling-off or generation of cracks of the protective layer 4 were not observed even after keying operations in a number of 3,000,000. On the other hand, in various commercially available keypads for portable telephones in which the protective layer is constructed by an epoxy resin cured product, the protective layer generated peeling-off or cracks after keying operations in a number of up to 100,000 in cases of the raw fabric sheets A and C for keypad, in a number of up to 50,000 in case of the raw fabric sheets B and D for keypad, and in a number of up to 10,000 in case of the raw fabric sheet E for keypad, respectively.

In addition, the keypads according to the present invention and commercially available keypads for portable telephones in which the protective layer is constructed by an ultraviolet light absorber-containing epoxy resin cured product were left side by side by the window through which the sunlight streamed. As a result, the commercially available keypads were slightly yellowed 14 days after lapsing of time and distinctly yellowed 30 days after lapsing of time. On the other hand, in the keypads according to the present invention, slight signs of yellowing were merely observed in one year.

Incidentally, when no anionic polymerization promotor was internally added to the ethyl 2-cyanoacrylate, while the maximum thickness was limited (for example, up to about 0.2 mm), an effect as the protective layer was observed.

EXAMPLE 2

The same procedures as in Example 1 were repeated, except that a composition comprising a mixture of 4 parts of a 10% concentration solution of an amino-modified silicone oil having a viscosity of 1,200 cps/25° C., "SF8417" made by Toshiba Silicone Co., Ltd. dissolved in n-heptane, 0.2 part of N,N-dimethyloctylamine, and 95.8 parts of n-heptane was used as the primer for forming the primer coated layer 3 and that a mixture of 10 g of isobutyl 2-cyanoacrylate containing small amounts of hydroquinone and SO$_2$ and a 0.2% ultraviolet light absorber ("UVA-935LH" made by BASF AG) as the 2-cyanoacrylate for forming the protective layer 4 was added with 0.08 g of a 0.5% concentration composition of N,N-dimethylaniline as an anionic polymerization promotor dissolved in dibutyl phthalate as a plasticizer was used. In this case, preferred results as in Example 1 were also obtained.

According to the present invention, the protective layer 4 which has a high adhesion, hardly generates cracks even by keying operations in a number of times and hardly causes yellowing with a lapse of time can be provided in the display pattern 2 of the silicon rubber-made keypad. This protective layer 4 is markedly preferable from the standpoints of not only the formation operation of said layer but also the performance of the cured coated film of said instant layer as compared with the conventional protective layers using an epoxy resin. The obtained keypad is extremely preferable from the aesthetic point of view and easy for identifying the pattern and is advantageous from the standpoint of industrial productivity. In the light of the above, the keypad according to the present invention is of high performance and can meet the requirements for a higher degree.

While the invention has been described in detail and with reference to specific embodiments thereof, it will be apparent to one skilled in the art that various changes and modifications can be made therein without departing from the scope and spirit thereof.

What is claimed is:

1. A keypad comprising having a structure in which a protective layer made of a 2-cyanoacrylate cured product is provided in a protuberant state on a display pattern formed on a touch base of a silicone rubber-made keypad.

2. A keypad as claimed in claim 1, wherein said protective layer made of a 2-cyanoacrylate cured product is provided in a protuberant state on said display pattern formed on said touch base of a silicone rubber-made keypad via a primer coated layer.

3. A keypad as claimed in claim 2, wherein said primer coated layer is a layer comprising a silicone-based oil and a trialkylamine as main agents.

4. A keypad as claimed in claim 2, wherein said protective layer is formed from a 2-cyanoacrylate cured product having an anionic polymerization promotor internally added thereto.

5. A keypad as claimed in claim 2, wherein said protective layer is formed from a 2-cyanoacrylate cured product having an anionic polymerization promotor and an ultraviolet light absorber internally added thereto.

6. A keypad as claimed in claim 1, wherein said protective layer is formed from a 2-cyanoacrylate cured product having an anionic polymerization promotor internally added thereto.

7. A keypad as claimed in claim 1, wherein said protective layer is formed from a 2-cyanoacrylate cured product having an anionic polymerization promotor and an ultraviolet light absorber internally added thereto.

8. A process for producing a keypad comprising applying a 2-cyanoacrylate on a display pattern formed on a touch base of a silicone rubber-made keypad and curing it to form a protective layer made of a 2-cyanoacrylate cured product in a protuberant state.

9. A process as claimed in claim 8, wherein said 2-cyanoacrylate for forming said protective layer is a 2-cyanoacrylate having internally added thereto an anionic polymerization promotor dissolved in a plasticizer or a solvent.

10. A process as claimed in claim 8, wherein said 2-cyanoacrylate for forming said protective layer is a 2-cyanoacrylate having an anionic polymerization promotor and an ultraviolet light absorber internally added thereto.

11. A process for producing a keypad comprising applying a primer on a display pattern formed on a touch base of a silicone rubber-made keypad, drying it to form a primer coated layer, applying a 2-cyanoacrylate thereon, and then curing it to form a protective layer made of a 2-cyanoacrylate cured product in a protuberant state.

12. A process as claimed in claim 11, wherein said primer for forming said primer coated layer has a composition comprising a silicone-based oil, a trialkylamine, and solvent.

13. A process as claimed in claim 11, wherein said 2-cyanoacrylate for forming said protective layer is a 2-cyanoacrylate having internally added thereto an anionic polymerization promotor dissolved in a plasticizer or a solvent.

14. A process as claimed in claim 11, wherein said 2-cyanoacrylate for forming said protective layer is a 2-cyanoacrylate having an anionic polymerization promotor and an ultraviolet light absorber internally added thereto.

\* \* \* \* \*